(12) United States Patent
Chen et al.

(10) Patent No.: US 8,770,841 B2
(45) Date of Patent: Jul. 8, 2014

(54) HYDROSTATIC PLATE BEARING

(71) Applicant: Industrial Technology Research Institute, Hsin-Chu (TW)

(72) Inventors: Shang-Te Chen, Taichung (TW); Hsi-Hung Hsiao, Taichung County (TW); Bo-Tsun Chen, Taichung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 13/744,774

(22) Filed: Jan. 18, 2013

(65) Prior Publication Data

US 2014/0053937 A1 Feb. 27, 2014

(30) Foreign Application Priority Data

Aug. 21, 2012 (TW) .............................. 101130263 A

(51) Int. Cl.
*F16C 32/06* (2006.01)
(52) U.S. Cl.
USPC ............................................................ 384/12
(58) Field of Classification Search
CPC ..... F16C 29/025; F16C 32/06; F16C 32/0603
USPC .................................. 384/12, 13; 184/5, 100
See application file for complete search history.

(56) References Cited

U.S. PATENT DOCUMENTS

| | | | |
|---|---|---|---|
| 4,090,743 A | 5/1978 | Suzuki et al. | |
| 4,368,930 A * | 1/1983 | Duchaine | 384/12 |
| 4,560,213 A * | 12/1985 | Enderle et al. | 384/12 |
| 5,106,204 A * | 4/1992 | Dunham | 384/12 |
| 2004/0262915 A1 | 12/2004 | Hucker et al. | |

FOREIGN PATENT DOCUMENTS

| | | |
|---|---|---|
| DE | 3150117 A1 | 7/1983 |
| DE | 3533037 C1 | 12/1986 |
| DE | 19737781 A1 | 3/1999 |
| DE | 102004040155 A1 | 2/2006 |
| EP | 1007861 B1 | 9/2002 |
| EP | 0840190 B1 | 10/2002 |
| ES | 2181268 T3 | 2/2003 |
| JP | 2000018247 A | 1/2000 |
| JP | 2010096311 A | 4/2010 |
| JP | 2010124565 | 6/2010 |
| KR | 20100087753 | 8/2010 |

(Continued)

OTHER PUBLICATIONS

Zollern, "Zollern Torque Motors", 2010, Zollern Maschinenbauelemente GmbH & Co. KG.

(Continued)

*Primary Examiner* — Phililp A Johnson
(74) *Attorney, Agent, or Firm* — WPAT, PC; Justin King

(57) ABSTRACT

The present disclosure relates to a hydrostatic plate bearing, which comprises: a body, and a plurality of restrictors. Wherein, the body is formed with a mounting surface and an oil chamber that are disposed opposite to each other; the plural restrictors includes an orifice restrictor and a membrane restrictor while allowing the orifice restrictor and the membrane restrictor to be serially connected to each other. Operationally, a working fluid that is flowing into the body via the mounting surface is split to flow through the orifice restrictor and the membrane restrictor, in that the split flow of the working fluid that is flowing through the orifice restrictor is guided to flow into the oil chamber.

10 Claims, 4 Drawing Sheets

(56) References Cited

FOREIGN PATENT DOCUMENTS

| TW | M261627 | 4/2005 |
|---|---|---|
| TW | I279961 | 4/2007 |
| TW | I299014 | 7/2008 |
| TW | 201040406 | 11/2010 |
| TW | 201216027 | 4/2012 |

OTHER PUBLICATIONS

Chen et al., "Operationally, a hydrostatic slideway utilizes the load variation on a workbench that us induced by the vertical cutting force variation in a machining process for obtaining a pressure balance to be used for ensuring the workbench and a working piece to move smoothly during the machining process, whereas the adverse influence of the load variation is eliminated by a means of pressure feedback.", 1994-2007, China Academic Journal Electronic Publishing House.

Chen, "A hydrostatic bearing system is composed of a bearing, a compensating unit and a oil supply.", 1980, National defence industrial press.

Chang, et al, "The following is a flow chart depicting steps of a hydrostatic bearing calculation." 2007, Publishing House of Electronic Industry.

Ding, "The capillary restrictor is commonly used in hydrostatic slideway, and the membranerestrictor is preferred for those hydrostatic slideway designed for bearing large eccentric load or for providing higher oil film stiffness.", 1989, Shanghai scientific & Technical Publishers.

Transatlantic Connection, Inc "Hydrostatic Slides", Jul. 2007, pp. 1-4, engineering expertise and experience for the machine tool industry.

\* cited by examiner

HYDROSTATIC PLATE BEARING

CROSS REFERENCE TO RELATED APPLICATION

The present application is based on, and claims priority from, Taiwan (International) Application Ser. No. 101130263, filed on Aug. 21, 2012, the disclosure of which is hereby incorporated by reference herein in its entirety.

TECHNICAL FIELD

The present disclosure relates to a hydrostatic restrictor, and more particularly, to a hydrostatic plate bearing.

BACKGROUND

Nowadays, there are many types of flow restrictors available on the market, which include: membrane restrictors, slideway restrictors, capillary restrictors, orifice restrictors, and so on. Generally, a flow restrictor is a device installed inside all kinds of machines for buffering and compensating pressure variation between a pressure source and its corresponding load ends. Ideally, flow restrictors should be designed with high stiffness for allowing low pressure operation. However, for those conventional flow restrictors that are available today, they all have the following shortcomings, which are high operation pressure, low stiffness, high manufacturing cost, difficult to adjust and replace, poor rotation-speed adaptation and poor stability. Not to mention that those conventional flow restrictor can be deformed easily during operation which not only can cause damages to itself, but also to the machinery using the flow restrictors.

SUMMARY

The present disclosure relates to a hydrostatic plate bearing.

In an exemplary embodiment, the present disclosure provides a hydrostatic plate bearing, which comprises: a body, and a plurality of restrictors; wherein, the body is formed with a mounting surface and an oil chamber that are disposed opposite to each other; the plural restrictors includes an orifice restrictor and a membrane restrictor while allowing the orifice restrictor and the membrane restrictor to be serially connected to each other, and thus, operationally, a working fluid that is flowing into the body via the mounting surface is split to flow through the orifice restrictor and the membrane restrictor, in that the split flow of the working fluid that is flowing through the orifice restrictor is guided to flow into the oil chamber.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
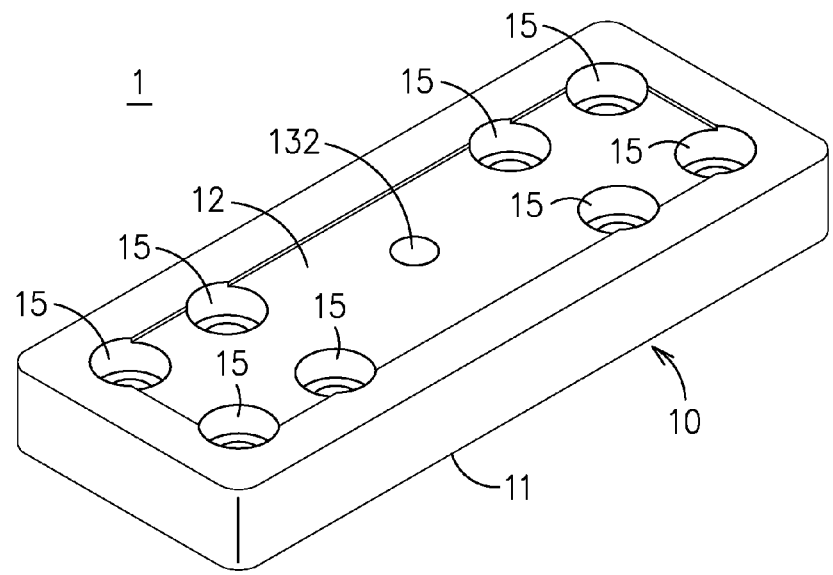
FIG. 1 is a schematic diagram showing a hydrostatic plate bearing according to a first embodiment of the present disclosure.
Figure 2:
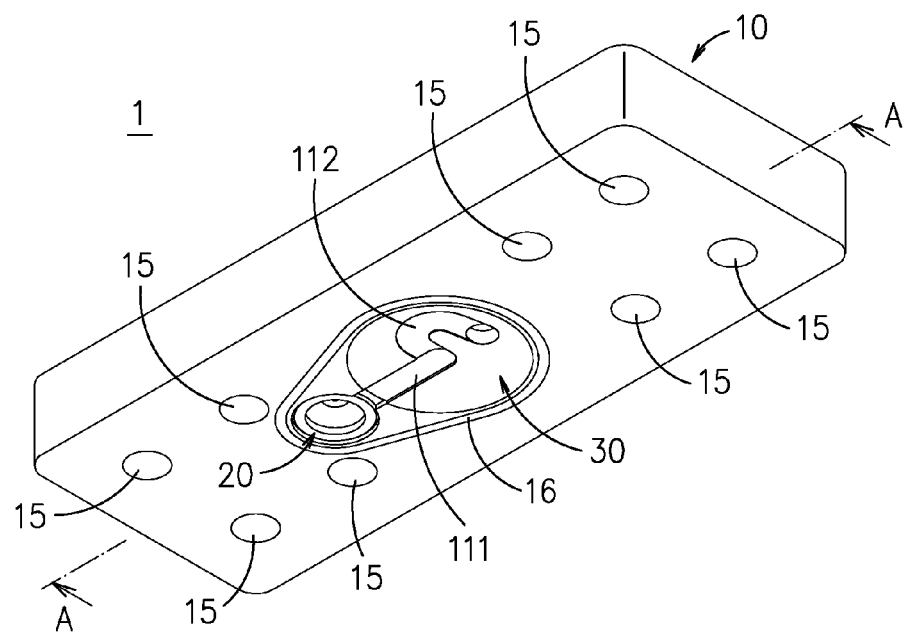
FIG. 2 is a bottom view of the hydrostatic plate bearing shown in FIG. 1.
Figure 3:
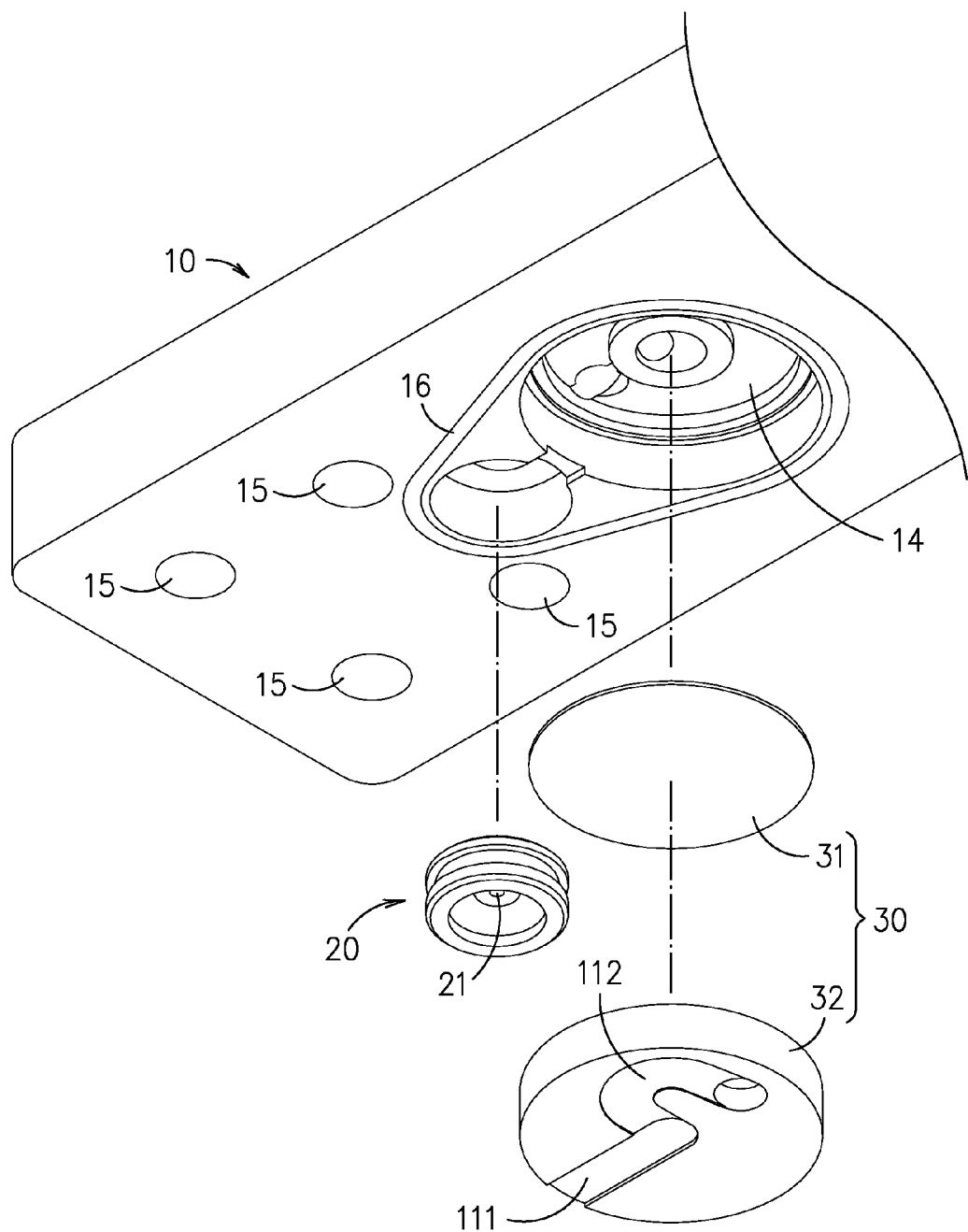
FIG. 3 is a partial exploded view of the hydrostatic plate bearing shown in FIG. 1.
Figure 4:
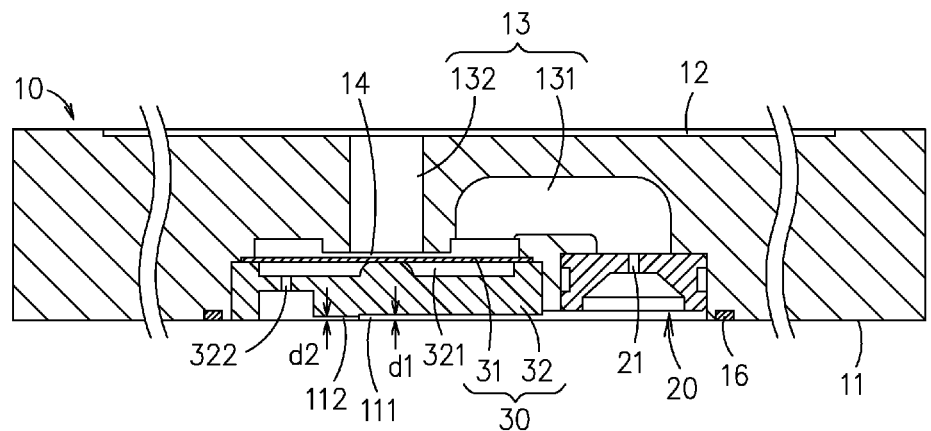
FIG. 4 is an A-A cross sectional view of FIG. 2.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1 to FIG. 4, which show a hydrostatic plate bearing according to a first embodiment of the present disclosure. As shown in FIG. 1 to FIG. 4, the hydrostatic plate bearing 1 includes a body 10, which is formed with a mounting surface 11, and an oil chamber 12 that are disposed opposite to each other; and in this embodiment, the mounting surface 11 is substantially the bottom surface of the body 10 while the oil chamber 12 is formed on the top surface of the body 10. In this embodiment, there is an orifice restrictor 20 and a membrane restrictor 30 disposed inside the body 10, in which the orifice restrictor 20 has a first hole 21 formed thereat and the membrane restrictor 30 is composed of a thin film 31 and a circular block 32. Moreover, the circular block 32 is formed with a second chamber 321 and a second hole 322, and the thin film 31 is made of a flexible metal film. The body 10 has a flow channel 13 and a first chamber 14 formed therein, whereas the flow channel 13 is arranged in fluid communication with the first chamber 14. Notably, the thin film 31 is arranged sandwiching between the first chamber 14 and the second chamber 321. In this embodiment, the flow channel 13 is composed of a first channel 131 and a second channel 132, in which the first channel 131 is connected respectively by two opposite ends thereof to the first hole 21 of the orifice restrictor 20 and the first chamber 14, and the second channel 132 is connected respectively by two opposite ends thereof to the first chamber 14 and the oil chamber 12. In addition, the orifice restrictor 20 and the membrane restrictor 30 are connected with each other in a serial connection manner by the use of the second channel 132.

Moreover, there is a first bypass conduit 111 and a second bypass conduit arranged on the mounting surface 11, and in this embodiment, the first bypass conduit 111 and the second bypass conduit 112 are disposed on the circular block 32 of the membrane restrictor 30, but they are not limited thereby. The first bypass conduit 111 is substantially a channel recessed in the mounting surface 11 by a first depth d1; the second bypass conduit 112 is substantially another channel recessed in the mounting surface 11 by a second depth d2; and the first depth d1 is larger than the second depth d2. Furthermore, the first bypass conduit 111 and the second bypass conduit 112 are connected to each other while allowing an end of the first bypass conduit 111 that is opposite to an end thereof connecting to the second bypass conduit 112 to be connected to the first hole 21, and an end of the second bypass conduit 112 that is opposite to an end thereof connecting to the first bypass conduit 111 to be connected to the second hole 322.

Figure 5:
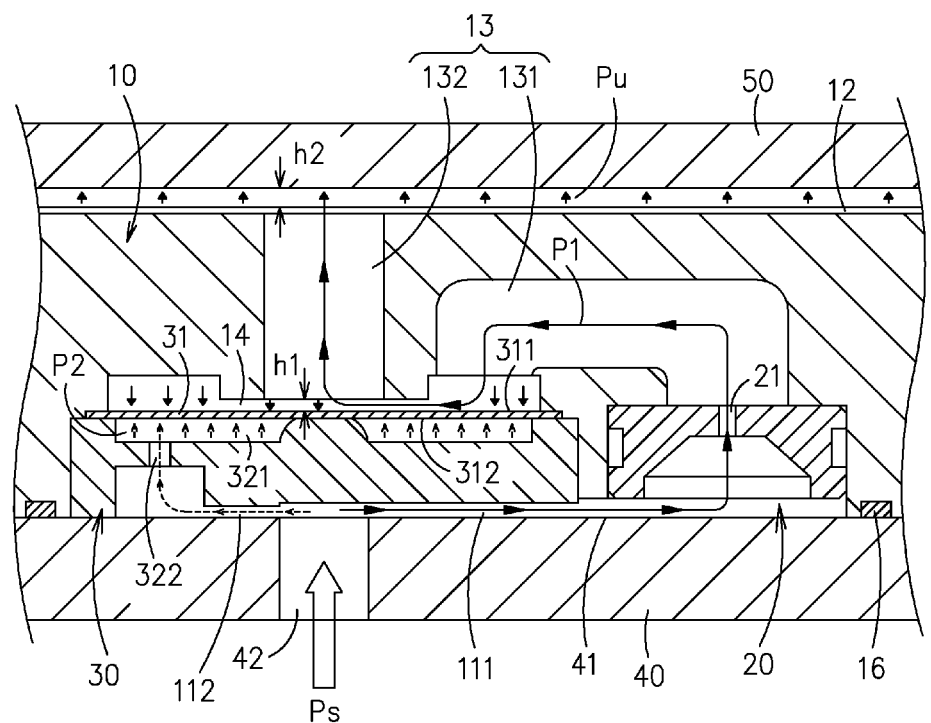
FIG. 5 is an enlarged cross sectional diagram showing the flowing path of a working fluid in a hydrostatic plate bearing of the present disclosure that is sandwiched between a worktable and a load.

In this embodiment, the body 10 further has a plurality of screw holes 15 formed thereon, and each of the plural screw holes 15 is provided for receiving a bolt so as to fix the body on a working surface 41 of a worktable 40, as shown in FIG. 5. The mounting surface 11 has a sealing element 16 disposed thereat in a manner that the sealing element 16 is arranged surrounding the circumference of an area enclosing the orifice restrictor 20 and the membrane restrictor 30.

Please refer to FIG. 5, which is an enlarged cross sectional diagram showing the flowing path of a working fluid in a hydrostatic plate bearing of the present disclosure that is sandwiched between a worktable and a load. As shown in FIG. 5, the body 10 is disposed on a planar surface 41 of a worktable 40 in a manner that the mounting surface 11 of the body 10 is orientated facing toward the planar surface 40 while allowing the surface of the body at which the oil chamber 12 is arranged to be used for carrying a load 50. Moreover, the worktable 40 is formed with an opening that is arranged in an area capable of being surrounded by the sealing element 16. Thereby, the sealing element 16 is arranged surrounding the circumference of an area enclosing the orifice restrictor 20, the membrane restrictor 30 and also the circumference of the opening 42 of the worktable 40. Moreover, the opening 42 is arranged connecting to the first bypass conduit 111 and the second bypass conduit 112, and thereby, a passageway is achieved between the opening 42, the orifice restrictor 20, the first channel 131, the first chamber 14, the oil chamber 12 and the second channel 132. As shown in FIG. 5, the opening 42 is connected to a pressure source Ps, so that the working fluid from the pressure source Ps is enabled to flow into the space sandwiched between body 10 and the planar surface 41 via the opening 42, and then to be spit into a first fluid and a second fluid to flow respectively into the first bypass conduit 111 and the second bypass conduit 112, which are flowing in different paths as indicated by the solid-line arrows and the dotted-line arrows shown in FIG. 5. Since the first depth d1 is larger than the second depth d2, the amount of the working fluid that is split to flow into the first bypass conduit 111 is larger than those being split to flow into the second bypass conduit 112.

As the flowing path of a first fluid split from the working fluid indicated by solid-line arrows that are shown in FIG. 5, the first fluid that is split to flow into the first bypass conduit 111 is guided to flow sequentially into the first hole 21 of the orifice restrictor 20, the first channel 131, the first chamber 14, the second channel 132, and finally to the oil chamber 12. Consequently, the hydraulic pressure resulting from the flow of the first fluid will press upon the top surface 311 of the thin film 32 so as to force a first gap h1 to be formed inside the first chamber 14. It is noted that there is a so-called two-stage pressure drop happening during the period of the first fluid entering the body 10 and flowing out of the body 10. That is, when the first fluid is flowing through the first hole 21, the flow of the first fluid is subjected to a first flow restriction process as the flow is restrict by the first hole 21, and thus the pressure of the first fluid is dropped to a first regulating pressure P1; and then, when the first fluid is flowing into the first chamber 14 through the first channel 131, the flow of the first fluid is subjected to a second flow restriction process by the thin film 31, and thereby, at the time when the first fluid is flowing to a space between the body 10 and the load, its pressure is further being adjusted to a working pressure Pu.

As the flowing path of a second fluid split from the working fluid indicated by dotted-line arrows that are shown in FIG. 5, the second fluid that is split to flow into the second bypass conduit 112 is guided to flow sequentially into the second hole 322 of the membrane restrictor 30, and the second chamber 321. When the second fluid is flowing through the second hole 322, the flow of the second fluid is subjected to a flow restriction process as the flow is restrict by the second hole 322 and thus the pressure of the second fluid is dropped to a second regulating pressure P2, that is acting upon the bottom surface 312 of the thin film 32.

As shown in FIG. 5, when the load is increased, i.e. when the pressure from the load 50 is increased, the working pressure Pu will be increased correspondingly so that the pressure acting upon the thin film 31 is increased as well, resulting that the thin film 31 is deformed for causing the first gap h1 to be enlarged. Consequently, the flow resistance of the first fluid flowing through the top surface 311 of the thin film 31 is decreased, and thus, the flow speed and amount of the first fluid is increased for allowing more first fluid to flow into the space sandwiched between the body 10 and load 50 in response to the increasing pressure of the load 50 so as to maintain the second gap h2 unchanged. Simultaneously, by the flow restriction of the first hole 21 and the second hole 322, the stiffness of the bearing is increased. On the other hand, when the pressure of the load 50 is deceased, the working pressure Pu will be decreased correspondingly so that the pressure acting upon the thin film 31 is decreased as well, resulting that the first gap h1 is narrowed for enabling the flow resistance of the first fluid flowing through the bottom surface 312 of the thin film 31 to decrease. Consequently, the flow speed and amount of the first fluid is decreased for allowing less first fluid to flow into the space sandwiched between the body 10 and load 50 in response to the decreasing pressure of the load 50 so as to maintain the second gap h2 unchanged. As the pressures resulting from the first fluid and the second fluid are acting respectively on two opposite surfaces of the thin film 31, the pressures are designed to be decreased in a stepwise manner for allowing corresponding flow compensation in response to the variation of external load.

Figure 6:
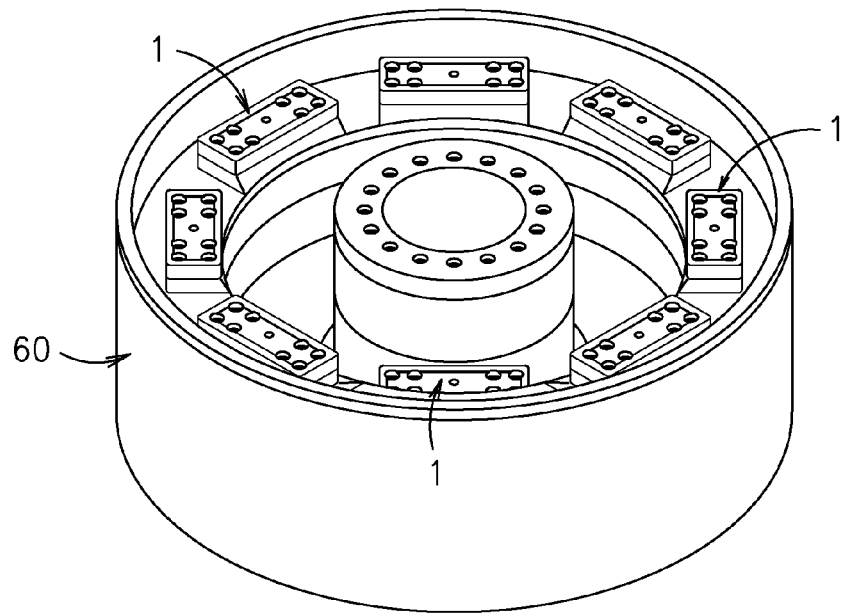
FIG. 6 is a schematic diagram showing the application of a plurality of the hydrostatic plate bearings of FIG. 1 in a rotary table.
Figure 7:
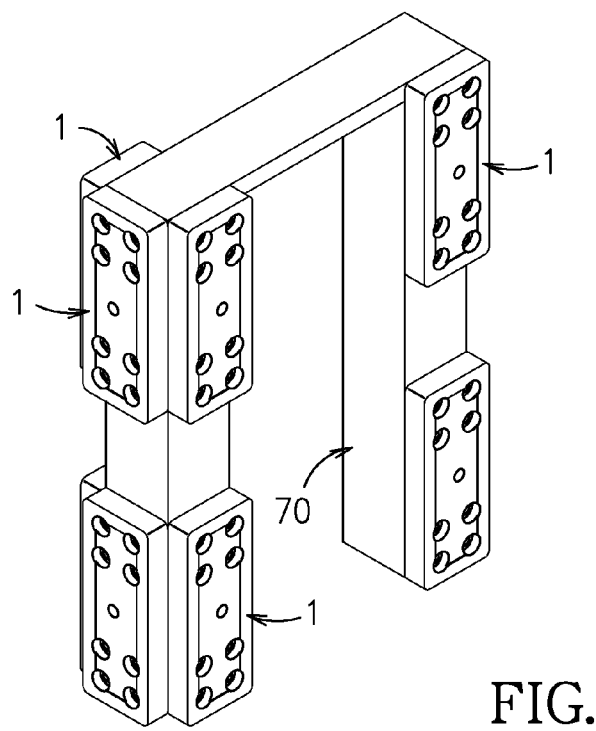
FIG. 7 is a schematic diagram showing the application of a plurality of the hydrostatic plate bearings of FIG. 1 in a linear table.

Please refer to FIG. 6 and FIG. 7, which respectively is a schematic diagram showing the application of a plurality of the hydrostatic plate bearings of FIG. 1 in a rotary table; and a schematic diagram showing the application of a plurality of the hydrostatic plate bearings of FIG. 1 in a linear table. As shown in FIG. 6 and FIG. 7, due to the modularized design concept, the hydrostatic plate bearing of the present disclosure can be adapted for either a rotary table 60 or a linear table 70; and can be easily replaced when damaged without having to dismantle the whole assembly.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A hydrostatic plate bearing, comprising:
a body, formed with a mounting surface and an oil chamber that are disposed opposite to each other; and
a plurality of restrictors, disposed on the body, including an orifice restrictor and a membrane restrictor that are arranged horizontally and serially connecting to each other.

2. A hydrostatic plate bearing comprising:
a body, formed with a mounting surface and an oil chamber that are disposed opposite to each other; and
a plurality of restrictors, disposed on the body, including an orifice restrictor and a membrane restrictor that are arranged serially connecting to each other;
wherein, a working fluid that is flowing into the body via the mounting surface is split to flow through the orifice restrictor and the membrane restrictor while allowing the split flow of the working fluid that is flowing through the orifice restrictor to flow into the oil chamber.

3. A hydrostatic plate bearing comprising:
a body, formed with a mounting surface and an oil chamber that are disposed opposite to each other; and
a plurality of restrictors, disposed on the body, including an orifice restrictor and a membrane restrictor that are arranged serially connecting to each other;
wherein the body has a flow channel and a first chamber formed therein in a manner that the flow channel is arranged in fluid communication with the first chamber while allowing two opposite ends of the flow channel to connected respectively to the orifice restrictor and the oil chamber and also enabling the orifice restrictor and the membrane restrictor to be in serial connection with each other via the flow channel; the membrane restrictor is configured with a thin film and a second chamber in a manner that the thin film is sandwiched between the first chamber and the second chamber; and the working fluid is split into a first fluid and a second fluid while enabling the first fluid to flow sequentially into the orifice restrictor, the flow channel, the first chamber and finally to the oil chamber, and simultaneously enabling the second fluid to flow into the membrane restrictor, and thereby, enabling the respective hydraulic pressures resulting from the first fluid and the second fluid to act upon two opposite surfaces of the thin film.

4. The hydrostatic plate bearing of claim 3, wherein the flow channel is composed of a first channel and a second channel; the first channel is connected respectively by two opposite ends thereof to the orifice restrictor and the first chamber; the second channel is connected respectively by two opposite ends thereof to the first chamber and the oil chamber; and thereby, a passageway is achieved between the orifice restrictor, the first channel, the first chamber, the second channel and the oil chamber.

5. The hydrostatic plate bearing of claim 4, wherein the orifice restrictor has a first hole and the membrane restrictor has a second hole, and thereby, the first fluid is enabled to flow into the first channel through the first hole while the second fluid is enabled to flow into the first chamber through the second hole.

6. The hydrostatic plate bearing of claim 5, wherein the mounting surface is formed with a first bypass conduit and a second bypass conduit that are connected to each other while allowing an end of the first bypass conduit that is opposite to an end thereof connecting to the second bypass conduit to be connected to the first hole, and an end of the second bypass conduit that is opposite to an end thereof connecting to the first bypass conduit to be connected to the second hole.

7. The hydrostatic plate bearing of claim 6, wherein the first bypass conduit is substantially a channel recessed in the mounting surface by a first depth; the second bypass conduit is substantially a channel recessed in the mounting surface by a second depth; and the first depth is larger than the second depth.

8. The hydrostatic plate bearing of claim 6, wherein the body further comprises a plurality of screw holes, each being provided for receiving a bolt; and thereby, the body is fixed on a planar surface of a worktable with the mounting surface of the body facing toward the planar surface.

9. The hydrostatic plate bearing of claim 8, wherein the worktable is formed with an opening; the mounting surface has a sealing element disposed thereat in a manner that the sealing element is arranged surrounding the circumference of an area enclosing the plural restrictors and also the circumference of the opening of the worktable; and the opening is arranged connecting to the first bypass conduit and the second bypass conduit for allowing the working fluid to flow into the body via the opening and then to be spit to flow respectively into the first bypass conduit and the second bypass conduit.

10. The hydrostatic plate bearing of claim 3, wherein the thin film is made of a flexible metal thin film.

* * * * *